United States Patent Office 2,735,827
Patented Feb. 21, 1956

2,735,827
ACRYLONITRILE COPOLYMERS

Maurice Louis Auguste Fluchaire and Jean Auguste Phelisse, Lyon, France, assignors to Societe des Usines Chimiques Rhone Poulenc, Paris, France No Drawing. Application June 24, 1952,
Serial No. 295,351

Claims priority, application France June 28, 1951

5 Claims. (Cl. 260—32.6)

This invention relates to acrylonitrile copolymers and to the production of artificial filaments and other products therefrom.

It is known to produce artificial filaments having a basis of acrylonitrile polymers. The method necessitates the use of such polymers which gives, in the cold, in dimethylformamide, easily mobile fluid suspensions. It has been proposed to employ certain copolymers of acrylonitrile with vinyl ethers of amino alcohols to yield compositions which have dyeing affinity for acid dyestuffs. However, these compositions have a low content of amino ether groups and they give, in the cold, in dimethylformamide, suspensions which are viscous and difficultly mobile.

It has now been found that by copolymerising, in concentrated aqueous solution, acrylonitrile and a vinyl ether of an amino alcohol, in proportions such that the amino ether constitutes between 20 and 95% by weight of the two monomers, there is obtained a copolymer having a high amino ether content which is readily soluble in the cold in dimethylformamide. Solutions of the said copolymer in dimethylformamide mixed with proportions of polyacrylonitrile provide suspensions which are fluid when cold, freely mobile and suitable for spinning to yield products having dyeing affinity for acid dyestuffs.

According to a first feature of the present invention, therefore, there are provided new copolymers of acrylonitrile with vinyl ethers of amino alcohols of the general formula:

III.

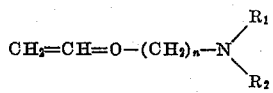

where $n$ is an integer not greater than 5, and $R_1$ and $R_2$ are the same or different and separately represent hydrogen atoms or saturated or unsaturated hydrocarbon radicals, or together with the nitrogen atom complete a heterocyclic nucleus, the said copolymers containing at least 20% by weight of the said vinyl ethers of amino alcohol.

According to a further aspect of this invention, new compositions of matter comprise a copolymer as just defined in admixture with polyacrylonitrile and compositions containing the said ingredients in admixture in a medium of dimethylformamide.

In forming the copolymers of this invention there may be used with advantage the vinyl ethers of diethylamino ethanol, dimethylamino ethanol and of N-hydroxyethyl pyrrolidine.

The copolymerisation is effected in aqueous solution, the water employed optionally containing substances which assist the dissolution of the copolymerising substances. The copolymer formed, being insoluble in water, separates from the medium continuously with its formation. The medium may be acid or neutral in reaction.

The copolymerisation may be effected in the presence of various catalysts, e. g. alkali persulphates, hydrogen peroxide, stearyl peroxide, benzoyl peroxide and other per-compounds, redox systems and other generators of free radicles, in quantity varying with the nature of the catalyst and the desired speed of reaction. Part of the catalyst may be introduced initially and the remainder introduced during the course of the polymerisation.

The temperature at which the copolymerisation is effected may vary with the composition of the mixture and the quantity and nature of the catalyst. A temperature between room temperature and 60° C. is generally convenient.

The time taken for copolymerisation varies according to the nature of the catalyst and it is possible to reduce the reaction time by using strong concentrations of catalysts.

The quantity of water present is preferably such that the ratio of water to monomers present lies between 1 and 2 and preferably in the neighbourhood of 1.5. It has been found, in fact, that by copolymerising in concentrated aqueous solution there are obtained copolymers having a high content of amino groups.

It is sufficient to prepare small quantities of these copolymers having a high content of amino groups and to mix them with the desired quantity of pure polyacrylonitrile to produce mixtures having the desired content of amino groups. Thus, using only small quantities of the copolymers, one can obtain, by simple dilution with various quantities of polyacrylonitrile mixtures of which the constitution, and, in consequence the properties, vary widely and from which there can be made films, artificial filaments and plastic masses which are capable of being dyed like wool with acid dyestuffs. The following examples will serve to illustrate the invention, but are not to be regarded as limiting it in any way. The parts given are parts by weight.

Example I

A copolymer of acrylonitrile and the vinyl ether of dimethylamino ethanol is made as follows:

100 parts of acrylonitrile are dissolved in 250 parts of water together with 100 parts of the vinyl ether of dimethylamino ethanol and 80 parts of glacial acetic acid, the pH of the solution being 5.4. The clear solution thus obtained is warmed at 30° C. and there are added successively 50 parts of an 8% by weight aqueous solution of potassium persulphate and 25 parts of an 8% by weight aqueous solution of sodium bisulphite. An exothermic reaction takes place and the solution is maintained for four hours at 40° C. with stirring at the beginning of this period. There is then added over a period of 15 minutes 200 parts of water and 20 parts of acetic acid, the mixture being stirred. The solution is then poured into 2000 parts of aqueous solution of potassium carbonate (100 g. per litre) with continuous stirring. The precipitate obtained is washed with water and dried and there are thus obtained 162 parts of copolymer. 20 kg. of the copolymer thus prepared is dissolved in 500 kg. of dimethylformamide and 80 kg. of polyacrylonitrile is added and the resulting solution is spun in known manner to yield artificial filaments. The filaments obtained possess the same dyeing affinity for acid dyestuffs as a filament obtained from a copolymer of acrylonitrile and the vinyl ether of a dimethylamino ethanol containing 10% amino ether.

Example II 200 parts of acrylonitrile are dissolved in 500 parts of water together with 200 parts of the vinyl ether of β-hydroxyethyl-pyrrolidine and 130 parts of glacial acetic acid. The pH of the solution is 5.1. The clear solution thus obtained is warmed to 30° C. and there are added successively 100 parts of an 8% aqueous solution of potassium persulphate and 50 parts of an 8% aqueous solution of sodium bisulphite. An exothermic reaction takes place and the solution is maintained, with stirring at the beginning, for 1½ hours at 40° C. During 15 minutes 1000 parts of water are added with stirring and the solution is then poured into 2000 parts of potassium carbonate solution (125 g. per litre) stirring the whole time. The precipitate obtained is washed with water and dried, yielding 335 parts of the copolymer. A composition comprising 20 parts of the said copolymer and 80 parts of polyacrylonitrile dissolved in dimethylformamide and spun by known methods yields a filament having the same dyeing affinity as that in Example 1.

We claim:

1. A copolymer of acrylonitrile with a vinyl ether of an amino alcohol selected from the group consisting of diethylamino ethanol, dimethylamino ethanol and N-hydroxyethyl pyrrolidine, the said copolymer containing at least 20% by weight of the said vinyl ether of amino alcohol.

2. A composition of matter comprising polyacrylonitrile and a copolymer of acrylonitrile with a vinyl ether of an amino alcohol selected from the group consisting of diethylamino ethanol, dimethylamino ethanol and N-hydroxyethyl pyrrolidine, the said copolymer containing at least 20% by weight of the said vinyl ether of amino alcohol.

3. A composition of matter comprising, in a medium of dimethylformamide, polyacrylonitrile and a copolymer of acrylonitrile with a vinyl ether of an amino alcohol selected from the group consisting of diethylamino ethanol, dimethylamino ethanol and N-hydroxyethyl pyrrolidine, the said copolymer containing at least 20% by weight of the said vinyl ether of amino alcohol.

4. Process for the production of a copolymer which comprises copolymerising acrylonitrile and a vinyl ether of an amino alcohol selected from the group consisting of diethylamino ethanol, dimethylamino ethanol and N-hydroxyethyl pyrrolidine, the said vinyl ether constituting at least 20% by weight of the total monomers present, the said copolymerisation being effected in the presence of a quantity of water at most twice the weight of monomers present.

5. Process for the production of a copolymer which comprises copolymerising acrylonitrile and a vinyl ether of an amino alcohol selected from the group consisting of diethylamino ethanol, dimethylamino ethanol and N-hydroxyethyl pyrrolidine, the said vinyl ether constituting at least 20% by weight of the total monomers present, the said copolymerisation being effected in the presence of a quantity of water at most twice the weight of monomers present, and in the presence of a catalyst.

References Cited in the file of this patent

UNITED STATES PATENTS

| | | |
|---|---|---|
| 2,601,251 | Bruson | June 24, 1952 |
| 2,601,252 | Bruson | June 24, 1952 |